Patented Jan. 6, 1942

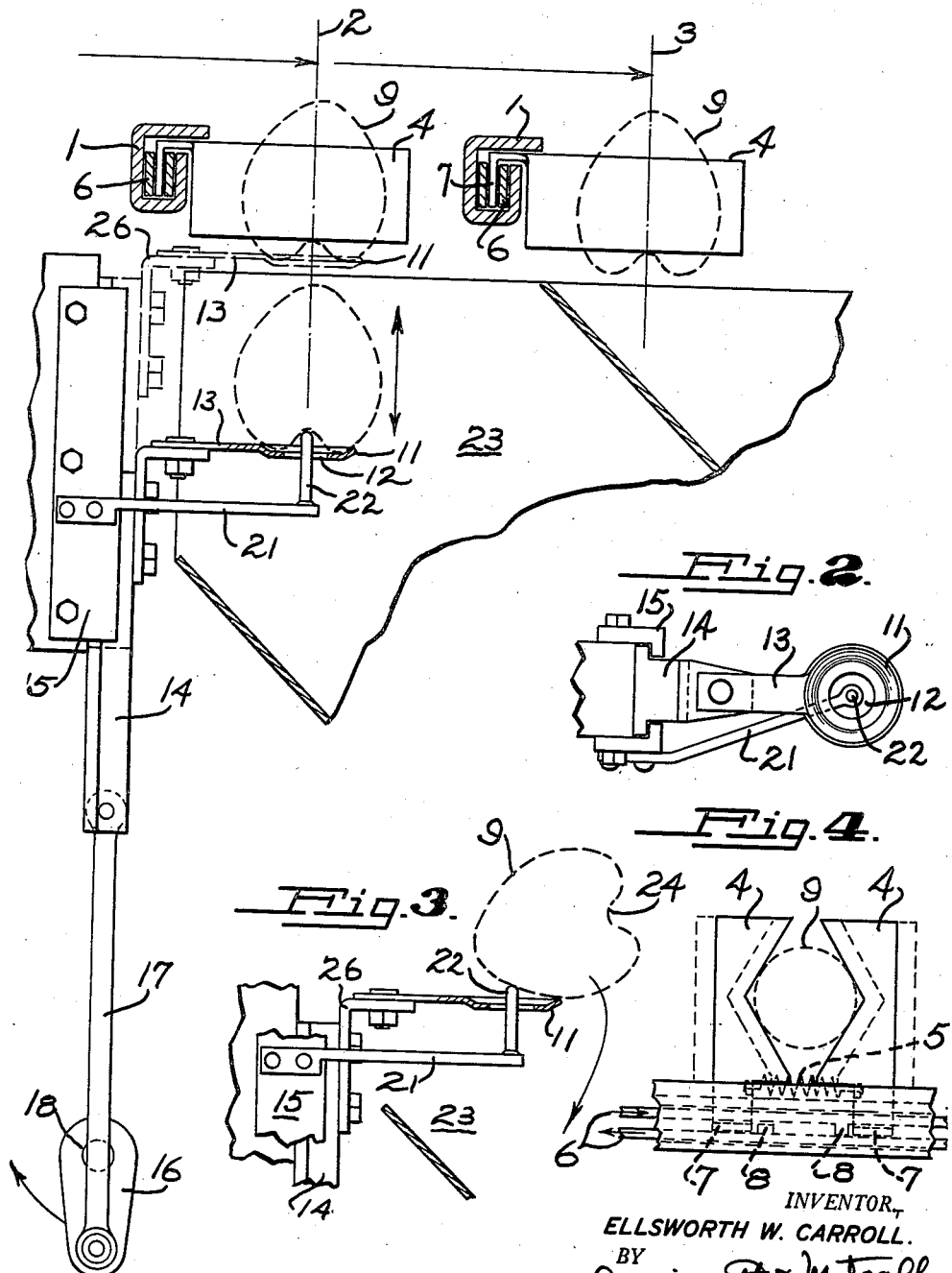

2,268,696

UNITED STATES PATENT OFFICE 2,268,696

FRUIT POSITION INSPECTOR

Ellsworth W. Carroll, San Francisco, Calif., assignor to S & W Fine Foods, Inc., San Francisco, Calif., a corporation of California Application August 29, 1939, Serial No. 292,432

2 Claims. (Cl. 209—72)

My invention relates to fruit position inspectors, and more particularly to a means and method of inspecting fruit having a well defined stem indent for the purpose of passing or rejecting fruit having the stem indent in proper or improper positions, respectively.

My invention is particularly applicable for use in connection with canning machinery where fruit is to be pitted or otherwise treated along a predetermined axis.

Among the objects of my invention are: To provide a means and method of separating orientated fruit from that which is not properly orientated; to provide a means and method of selecting from fruit such fruit as have their stem indents in a desired position; to provide a means and method of segregating properly orientated fruit from improperly orientated fruit; and to provide an entirely automatic means of inspecting fruit for position.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

In the drawing:

Fig. 1 is a view partly in vertical section and partly in elevation of one form of my invention.

Fig. 2 is a top plan view of the fruit support member.

Fig. 3 is a fragmentary view similar to Fig. 1, showing the action of the device on an improperly orientated fruit.

Fig. 4 is a plan view of a fruit clamp.

In the processing of fruit prior to packing for delivery to the customer, it is often desirable to pit such fruit or otherwise operate upon it along a predetermined axis. If a pitting operation is to be performed on the fruit, it is desirable that no fruit in the wrong position shall be presented to the pitter. Fruits such as cherries, for example, command premium prices when pitted through the axis, comprising a line drawn through the stem indent, the pit and the pointed end of the fruit, and it is highly desirable that when cherries have been orientated either by hand or by machine to be presented to the pitter, that no cherries with improper orientation shall be presented thereto.

My present invention broadly comprises segregating the improperly orientated fruit from the properly orientated fruit so that only the properly orientated fruit will be passed to the pitter or other device. I take advantage of the fact that the stem indent of a cherry is of sufficient depth to allow the entrance therein of a feeler while the fruit is positioned on a support, and I design the support in such a manner that if this feeler, when approaching the fruit, cannot enter the stem indent, the stability of the fruit on the support is overcome and the fruit is rolled thereoff. Thus, only fruits in a position where the feeler can enter the stem indent are passed for further operation thereon.

My invention may be more fully understood by direct reference to the drawing, which in diagrammatic form shows the essential features of my invention. A conveyor bar 1 which may be progressed in any convenient manner past a plurality of stations including an inspection station, indicated by broken line 2, and a further operation station, as indicated by broken line 3, carries clamp arms 4 on the advancing edge thereof, these clamp arms being urged together by a clamp spring 5, and positively opened by the relative motion of clamp operating rods 6 positioned inside of conveyor bar 1 and contacting the inner ends 7 of arms 4 by means of projecting lugs 8. Thus, relative motion of rod 6 will cause the arms 4 to open when moved in one direction, and to release the arms when moved in the opposite direction to clamp a fruit therebetween, as indicated by dotted line 9 which, in this case, will be exemplified by a cherry. Stations 2 and 3 are so positioned that when the cherry is held with the stem indent down, the axis of the fruit through indent, pit and pointed end will coincide with the broken lines 2 and 3 and will be vertical.

Beneath clamp arms 4 when in position 2, I place a concave support ring 11 having a central aperture 12 therein. Support ring 11 is maintained in a horizontal plane by a support arm 13 attached to a vertical slide 14 operating in slide bearings 15. Slide 14 is reciprocated vertically by crank arm 16 through connecting rod 17 as shaft 18 is rotated. Thus, the upper position of ring 11 is shown by dash lines 20 in Fig. 1, being just below the clamp, and the lower position is shown by the solid lines, being well below the clamp.

Attached to a stationary frame such as, for example, slide bearings 15, is a horizontally extending feeler arm 21 carrying a vertical feeler 22 which, when the ring 11 is in the lower position, passes through aperture 12 in ring 11 to project above the level of ring 11. Any fruit falling off ring 11 will fall in an improperly orientated fruit chute 23.

As conveyor bars 1 traverse a path which passes stations 2 and 3, at some point along this path cherries 9 are loaded into the clamps, when opened, with the dimple 24 of the cherry down. This orientation of the cherry may be accomplished by hand, for example, or may be accomplished by an automatic machine such as that described and claimed in my United States Letters Patent No. 2,220,511, issued November 5, 1940, entitled Continuous fruit orientating device, or it may be that the cherries are deposited within the clamps in heterogeneous positions. No matter how the cherries are held within clamp 4 when it reaches station 2, the operations which I am about to describe that take place at this station will never allow any fruit that is not properly orientated with the indent down to be passed on to the next station 3. The operation of the device at station 2 will next be described.

Assuming, for the first example, that cherry 9 reaches station 2 gripped between arms 4 by virtue of clamp spring 5, and properly orientated with the dimple down, the clamp is stopped, and shaft 18 is so synchronized with the motional drive of the clamp that ring 11 is at that time directly below the clamp and substantially coaxial with the fruit within the clamp. The clamp arms 4 are then spread to release the fruit, by the action of opening rods 6, and the cherry drops with the dimple down into ring 11 and is supported thereby in a stable position. Without further movement of the clamp arms 4, and with the arms still open, ring 11 then drops, with the cherry upon it, to its lowest position. As it does so, the stationary feeler 22 enters the aperture 12 within the ring 11 and enters the stem indent of the cherry. The cherry, being in a perfectly stable position on ring 11, remains in that position because the feeler 22 does not contact the cherry at all, or if it does, does so to an insufficient amount, in case of a shallow dimple, to upset the stability of the fruit. Consequently, when ring 11 rises again to its uppermost level it will carry the properly orientated fruit 9 along with it to a position between clamp arms 4, which is substantially the same position as received by the ring. Clamp arms 4 then close on the properly orientated cherry and the clamp and its contained fruit is then moved out of station 2 to station 3, which if desired may be a pitting mechanism where the pit can be removed along a vertical line in any desired or known manner.

There may be also other operations which can be performed on fruit in this position, such as for example, for the passing of toothpicks through fruit along a particular axis, for the decoration of fancy fruits or for any other purpose that may be apparent to those skilled in the art. I do not wish to be limited, therefore, to a following pitting step, although the proper relation of the vertical fruit axis to the axis of a pitting knife is a valuable result of my invention.

Let us assume, however, that cherry 9 does not arrive at station 2, held by clamp 4 with the dimple down. Under these circumstances, the clamp is released and the fruit dropped into ring 11 as before, and is supported by the ring in a stable condition. As the ring 11 drops, however, and feeler 22 enters the aperture in ring 11, the end of the feeler will contact the convex curvature of the fruit, upset the stability of the fruit on the ring, and roll it off the ring ito chute 23. Thus, when ring 11 returns to its position below the clamp 4 in station 2, it will no longer carry the cherry and the clamp will pass to station 3 without it.

Thus, it will be seen that I have caused an automatic segregation of improperly orientated fruit from those that are properly orientated. This automatic inspection is due to the fact that the stem indent in one case more or less coincides with the effective changed contour of the support, one being concave and the other convex. When, however, the stem indent is not presented to the support, the change of the effective shape of the support is such as to destroy the stability of the fruit and roll it off the support.

It should also be pointed out that while I have shown my invention as utilizing a feeler entering the support ring from the bottom, that it will also be obvious that the fruit can be placed in the support ring with the axis of the indent, pit and pointed end, in a horizontal position, and the feeler moved in from the side along a horizontal path. If the feeler enters the stem indent the stability of the fruit will not be disturbed. If, however, no stem indent is present in front of the feeler, the fruit will be toppled off the support to fall in chute 23. Thus, I do not wish to be limited to the exact structure shown, although this structure is preferred inasmuch as it lends itself to practical and continuous production where automatic orientation machinery, such as that referred to in my above-identified application, is used prior to the inspection step.

It can readily be seen, however, that inasmuch as the inspection can be done at high speed and is entirely automatic, the cherries can be fed directly to the inspector in random positions from a bulk feed container. In this case the inspector will select only those in proper indent positions and return the others for a reinspection. Even though only a small percentage of fruit arrives in proper position, by the use of multiple units and high speed, a desirable output can be obtained.

It should also be noted that I have shown the ring movable and the feeler stationary. It will, however, be obvious that any relative motion of the ring and feeler will accomplish the same result, and it will also be obvious that the ring and feeler may be in fixed relationship with the feeler entering the ring, if the cherry be deposited thereon by clamp movement with clamp withdrawal to allow improperly orientated cherries to roll therefrom. These and other modifications within the scope of the appended claims are deemed full equivalents.

I claim:

1. Means for inspecting the position of fruits having a stem indent, comprising a clamp having vertical opposed arms positively and horizontally movable to open said clamp and resilient means urging said arms together to grip a fruit therebetween, means for positioning said clamp with a fruit therein in a predetermined position, means operable to open said clamp in said position, a ring positioned immediately below said clamped fruit to receive and support the fruit released by said clamp, means for lowering said ring to a new position, and a stationary feeler entering said ring at said new position to enter the stem indent if down, and to push against the convex surface of said fruit if the stem indent is not down to roll said fruit off from said ring.

2. Means for inspecting the position of fruits having a stem indent, comprising a clamp having vertical opposed arms positively and horizontally movable to open said clamp and resilient means urging said arms together to grip a fruit therebetween, means for positioning said clamp with a fruit therein in a predetermined position, means operable to open said clamp in said position, a ring positioned immediately below said clamped fruit to receive and support the fruit released by said clamp, means for lowering said ring to a new position, and a stationary feeler entering said ring at said new position to enter the stem indent if down, and to push against the convex surface of said fruit if the stem indent is not down to roll said fruit off from said ring, the remainder of the stroke of said lowering means returning said ring to its initial position, and means releasing said clamp arms to grip any fruit still supported by said ring.

ELLSWORTH W. CARROLL.